(12) United States Patent
Lucas

(10) Patent No.: US 10,954,989 B2
(45) Date of Patent: Mar. 23, 2021

(54) SCREW WITH IRREGULAR KNURLING PATTERN

(71) Applicant: SHEH FUNG SCREWS CO., LTD., Kaohsiung (TW)

(72) Inventor: William Richard Lucas, Palos Verdes Estates, CA (US)

(73) Assignee: SHEH FUNG SCREWS CO., LTD., Kaohsiung (TW)

( * ) Notice: Subject to any disclaimer, the term of this patent is extended or adjusted under 35 U.S.C. 154(b) by 250 days.

(21) Appl. No.: 16/102,544

(22) Filed: Aug. 13, 2018

(65) Prior Publication Data

US 2019/0301516 A1    Oct. 3, 2019

Related U.S. Application Data

(60) Provisional application No. 62/649,555, filed on Mar. 28, 2018.

(51) Int. Cl.
*F16B 35/06* (2006.01)
*F16B 25/00* (2006.01)

(52) U.S. Cl.
CPC ........ *F16B 35/065* (2013.01); *F16B 25/0057* (2013.01); *F16B 25/0015* (2013.01)

(58) Field of Classification Search
CPC .......... F16B 35/065; F16B 25/0047; F16B 25/0057; F16B 25/0026; F16B 25/0042; F16B 25/0052; F16B 25/0015
USPC ...................... 411/386, 387.2, 399
See application file for complete search history.

(56) References Cited

U.S. PATENT DOCUMENTS

| 2,183,243 A | * | 12/1939 | Meersteiner | F16B 25/0052 411/453 |
| 2,191,771 A | * | 2/1940 | Olson | F16B 19/02 411/456 |
| 2,562,516 A | * | 7/1951 | Williams | F16B 25/0031 470/11 |
| 4,033,243 A | * | 7/1977 | Kirrish | F16B 37/145 411/338 |
| 4,718,802 A | * | 1/1988 | Rockenfeller | F16B 15/06 411/421 |
| 5,489,179 A | * | 2/1996 | Gabriel | F16B 15/0092 411/453 |

(Continued)

FOREIGN PATENT DOCUMENTS

WO   WO-2019091536 A1 * 5/2019 .......... F16B 25/0078

*Primary Examiner* — Victor D Batson
*Assistant Examiner* — Amit Singh Dhillon
(74) *Attorney, Agent, or Firm* — Innovation Capital Law Group, LLP; Vic Lin

(57) ABSTRACT

A screw includes a shank having a head, a point, a threaded section and a knurling section. The threaded section is located between the head and the point. The knurling section is located between the head and the threaded section. The knurling section includes a first set of grooves consisting of a plurality of first grooves and a second set of grooves consisting of a plurality of second grooves. The plurality of first grooves extends in a first angle relative to an axis of the shank. The plurality of second grooves extends in a second angle relative to the axis of the shank not parallel to the first angle. The first angle is equal to or larger than 0 degrees. The first grooves have unequal spacing. The first grooves intersect with the second grooves to form a plurality of intersecting zones with peaks and ridges of different sizes and shapes.

14 Claims, 13 Drawing Sheets

(56) References Cited

U.S. PATENT DOCUMENTS

| | | | | |
|---|---|---|---|---|
| 5,741,104 | A * | 4/1998 | Lat | F16B 15/0092 |
| | | | | 411/453 |
| 6,000,892 | A * | 12/1999 | Takasaki | F16B 25/0015 |
| | | | | 411/187 |
| 6,872,042 | B2 * | 3/2005 | Panasik | F16B 15/06 |
| | | | | 411/451.1 |
| 8,651,787 | B2 * | 2/2014 | Levey | F16B 37/122 |
| | | | | 411/180 |
| 8,888,428 | B2 * | 11/2014 | Park | B21K 1/70 |
| | | | | 411/180 |
| 9,903,409 | B2 * | 2/2018 | Prabhu | F16B 37/122 |
| 2001/0009638 | A1 * | 7/2001 | Crawford | E04C 3/16 |
| | | | | 411/387.2 |
| 2005/0226701 | A1 * | 10/2005 | Craven | F16B 35/048 |
| | | | | 411/399 |
| 2008/0232925 | A1 * | 9/2008 | Chang | F16B 25/10 |
| | | | | 411/387.4 |
| 2017/0227039 | A1 * | 8/2017 | Shih | F16B 25/0084 |
| 2017/0241463 | A1 * | 8/2017 | Shih | F16B 25/0084 |
| 2018/0156258 | A1 * | 6/2018 | Chao | F16B 25/0015 |

\* cited by examiner

SCREW WITH IRREGULAR KNURLING PATTERN

CROSS REFERENCE TO RELATED APPLICATION

The application claims the benefit of U.S. provisional application No. 62/649,555, filed on Mar. 28, 2018, and the entire contents of which are incorporated herein by reference.

BACKGROUND OF THE INVENTION

1. Field of the Invention

The present invention generally relates to a screw, and in particular a screw that has a section designed to bore the hole around the screw, making insertion easier and allowing for a clean surface finish.

2. Description of the Related Art

Over the years, screws have evolved to have more features added which are designed to improve installation. One way is to bore the hole larger to make countersinking the head easier. This allows the top of the head to sit on the same plane as the board being inserted into. This is often achieved using a "knurling" section between the threaded section of the shank and the head of the screw.

In some methods of construction, for example, building a deck out of wood, self-countersinking screws are used to improve the finished result by not having screw heads sticking up above the surface. When screwing into the wood with the self-countersinking screws, the knurling feature often used can be too aggressive and cause unwanted damage to the wood in the form of splitting or chipping of the board. This leaves a more damaged board around the screw.

In some methods of construction, a frangible material (not shown), such as sheets of drywall or cement backer board, is used. These are most commonly attached to the structure of the building using screws. Once attached, tiles or other finishing pieces are laid on top of the board. Because of this, it is crucial for the installed board to have a smooth and flat finish. While attaching such a frangible material, the problem arises of small and large particles in the board causing issues while driving the head of the screw into the material. This can cause the head of the screw to not seat properly which will leave an uneven surface. This can be either the head sticking too far above the board or the material of the board itself will bulge around the head of the screw above the plane of the material. This will cause an unsightly finish that, in the case of cement backer boards, can prevent the tiles from being flat.

FIG. 1 shows a conventional wood screw having a previously used style of knurling. The screw includes a shank 7 having a head 71 at one end, a point 72 at another end, and a threaded section 73 between the head 71 and the point 72. The screw is designed with a knurling section 74 that has multiple straight, vertical knurling threads running parallel with the axis of the screw. When the screw is being driven into the board, the particles of the board material can be carried out of the hole through the channels between the knurling threads of the knurling section 74.

FIG. 2 shows a conventional wood screw having another style of knurling that is more frequently used than that in FIG. 1. The screw also includes a shank 8 having a head 81, a point 82, and a threaded section 83 between the head 81 and the point 82. The screw is also designed with a knurling section 84 that have multiple knurling threads running at an angle with the axis of the screw. Typically, the knurling threads are at an extreme pitch either in the same direction of the threaded section 83 or in the counter direction. When the screw is being driven into the board, the particles of the board material can be carried out of the hole more smoothly than that shown in FIG. 1 due to the inclination of the knurling threads.

Although the above two styles of knurling can facilitate discharging the particles of the board material out of the hole, they can cause large chipping or splintering of the board, leaving an unsightly and potentially harmful finish.

FIG. 3 shows another conventional screw for a frangible material top board using crisscrossing threads that form many equilateral pyramids. The screw includes a shank 9 having a head 91, a point 92, a threaded section 93 between the head 91 and the point 92, and a knurling section 94 between the head 91 and the threaded section 93. The knurling section 94 includes a first set of grooves and a second set of grooves intersecting with the first set of grooves. The first set of grooves includes a plurality of first grooves 941 with equal spacing. The second set of grooves includes a plurality of second grooves 942 with equal spacing. The first grooves 941 intersect with the second grooves 942 to form a plurality of intersecting zones Z with regular shape, size, height and depth. This type of knurling can grind the particles of the board material into smaller size. However, the particles of the board material are usually of irregular sizes and shapes, such that this type of knurling is not able to properly grind the particles into powder.

In light of the above problems, it is necessary to improve the conventional screws.

SUMMARY OF THE INVENTION

It is therefore the objective of this invention to provide a screw which prevents the aforementioned problems from happening. In the case of frangible material, it accomplishes this by grinding particles of all sizes down to a powder while enabling the screw to seat cleanly into the board. In the case of wood, a less aggressive knurling is used that smoothly grinds the wood and also has channels to carry the wood particles out of the hole.

In an aspect, a screw including a shank having a head, a point, a threaded section and a knurling section is disclosed. The threaded section is located between the head and the point. The knurling section is located between the head and the threaded section. The knurling section includes a first set of grooves consisting of a plurality of first grooves and a second set of grooves consisting of a plurality of second grooves. The plurality of first grooves extends in a first angle relative to an axis of the shank. The plurality of second grooves extends in a second angle relative to the axis of the shank not parallel to the first angle. The first angle is equal to or larger than 0 degrees. The plurality of first grooves has unequal spacing. The plurality of first grooves intersects with the plurality of second grooves to form a plurality of intersecting zones with peaks and ridges of different sizes and shapes.

In another aspect, a screw including a shank having a head, a point, a threaded section and a knurling section is disclosed. The threaded section is located between the head and the point. The knurling section is located between the head and the threaded section. The knurling section includes a first set of grooves consisting of a plurality of first grooves and a second set of grooves consisting of a plurality of second grooves. The plurality of first grooves extends in a first angle relative to an axis of the shank. The plurality of second grooves extends in a second angle relative to the axis of the shank not parallel to the first angle. The first angle is equal to or larger than 0 degrees. The plurality of first grooves has unequal spacing and intersects with the plurality of second grooves outside a scope of the knurling section.

In an example, the plurality of second grooves has unequal spacing.

In the example, the peaks and the ridges have a same height relative to a surface of the shank.

In another example, the peaks and the ridges have different heights relative to a surface of the shank.

In the example, the first angle is larger than 0 degrees where one of the first and second sets of grooves runs in a same direction of the threaded section and another of the first and second sets of grooves runs in a counter direction of the threaded section.

In the example, the screw further includes a third set of grooves consisting of one or more third grooves intersecting with the first and second sets of grooves.

In the example, the first angle is equal to 0 degree where the first set of grooves runs along the axis of the shank and the second set of grooves runs at the second angle relative to the axis of the shank.

In the example, the screw further includes another threaded section located between the knurling section and the head and running in a same direction or a counter direction of the threaded section.

In the example, the screw further includes a blank section located between the knurling section and the head.

In another example, the screw further includes a blank section between the knurling section and the threaded section.

In the example, the screw further includes another blank section between the knurling section and the threaded section.

In the example, each of the peaks has a rounded point, and each of the ridges has a rounded top.

In another example, each of the peaks has a flattened point and each of the ridges has a flattened top.

In the example, the point is a self-drilling point.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
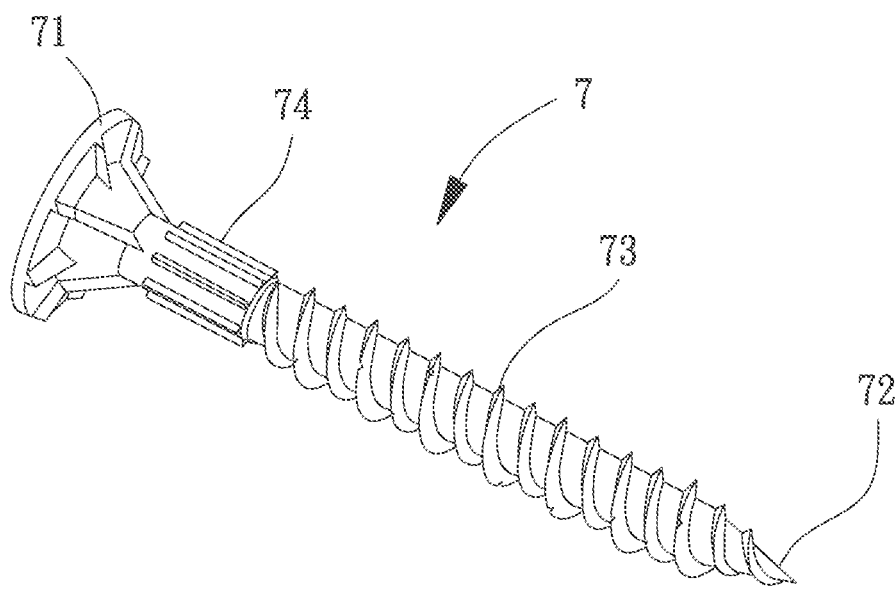
FIG. 1 shows a conventional screw having a style of knurling.
Figure 2:
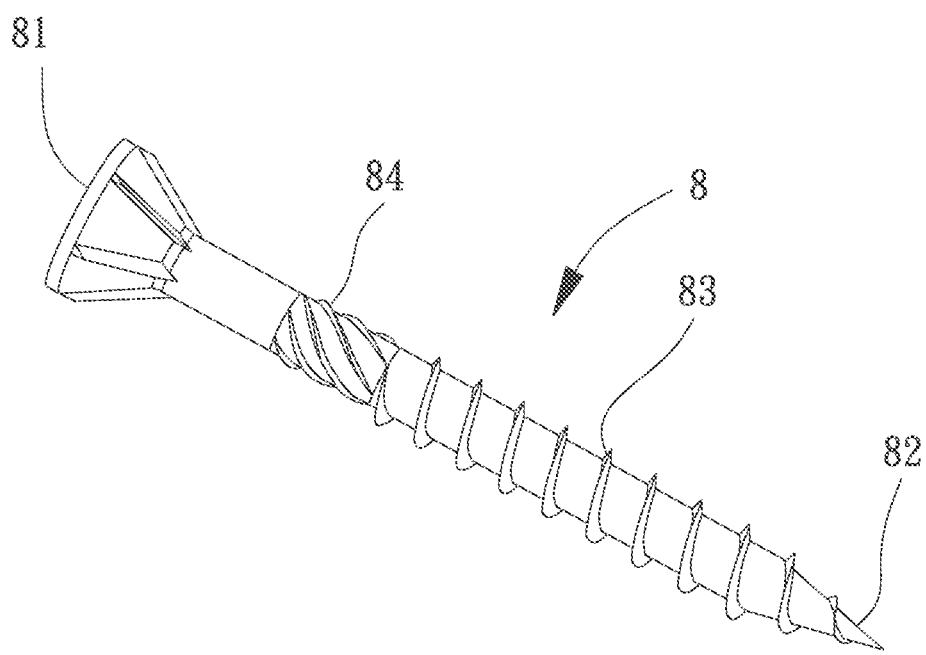
FIG. 2 shows a conventional screw having another style of knurling.
Figure 3:
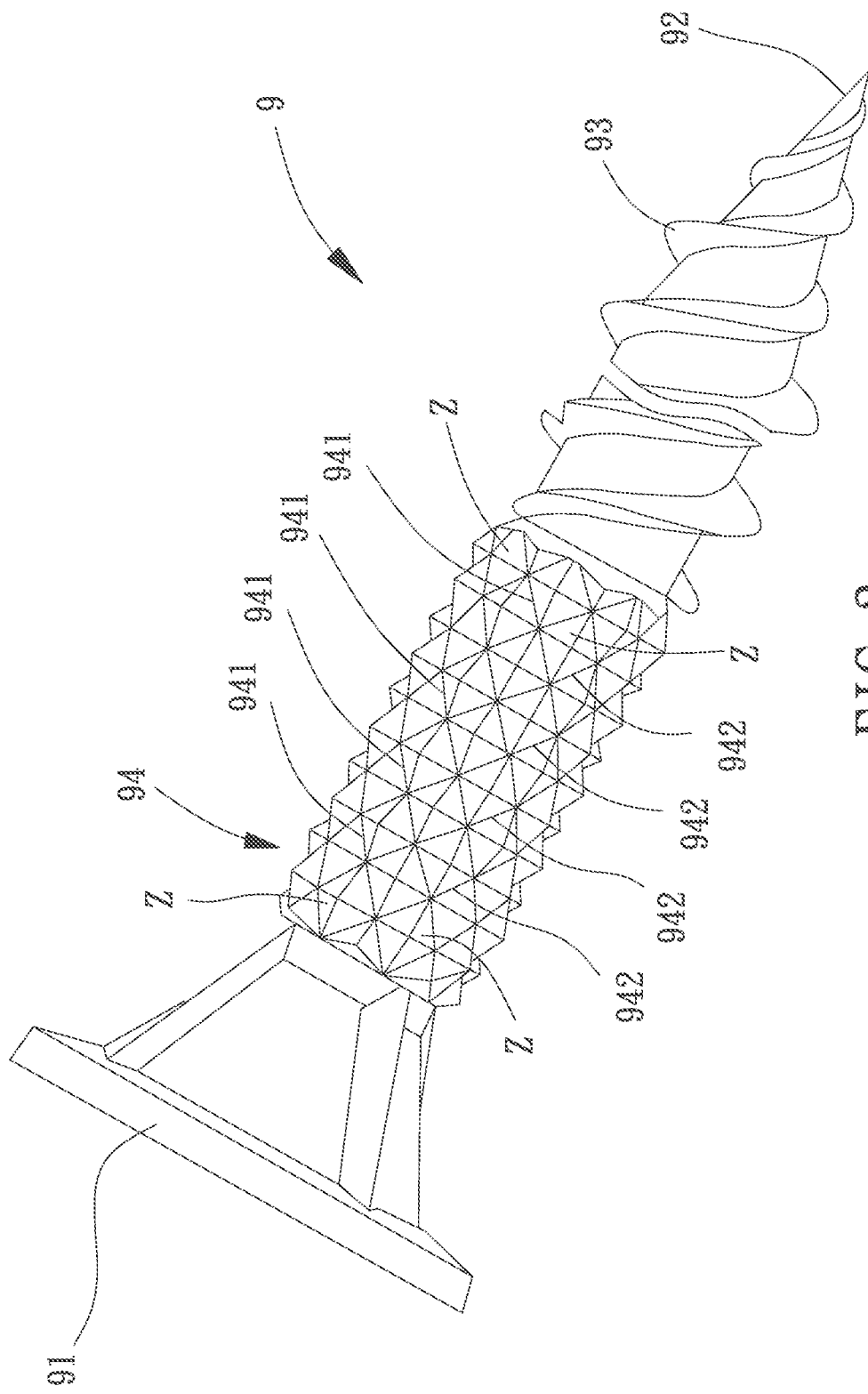
FIG. 3 shows a conventional screw having a further style of knurling.

In the various figures of the drawings, the same numerals designate the same or similar parts. Furthermore, when the terms "first," "second," "third," "fourth," "inner," "outer," "top," "bottom," "front," "rear," "axial," "radial," "longitudinal," "transverse," "length," "width," "height" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The terminology used herein is for the purpose of describing particular embodiments only and is not intended to be limiting of the invention. As used herein, the terms "and," "or," and "and/or" are used to include any and all combinations of the associated items. The terms "a," "an," and "the" are intended to include both singular and plural forms. The terms "may" or "might" are used to help describe a possible embodiment but not all possible embodiments and therefore are not intended to be limiting to the invention.

While this description will attempt to describe some, including the preferred embodiments of the invention, it will not be able to describe all possible embodiments that can form. As such, any stated geometry is used purely as an example and in no ways is intended to be limiting to the invention.

Figure 4:
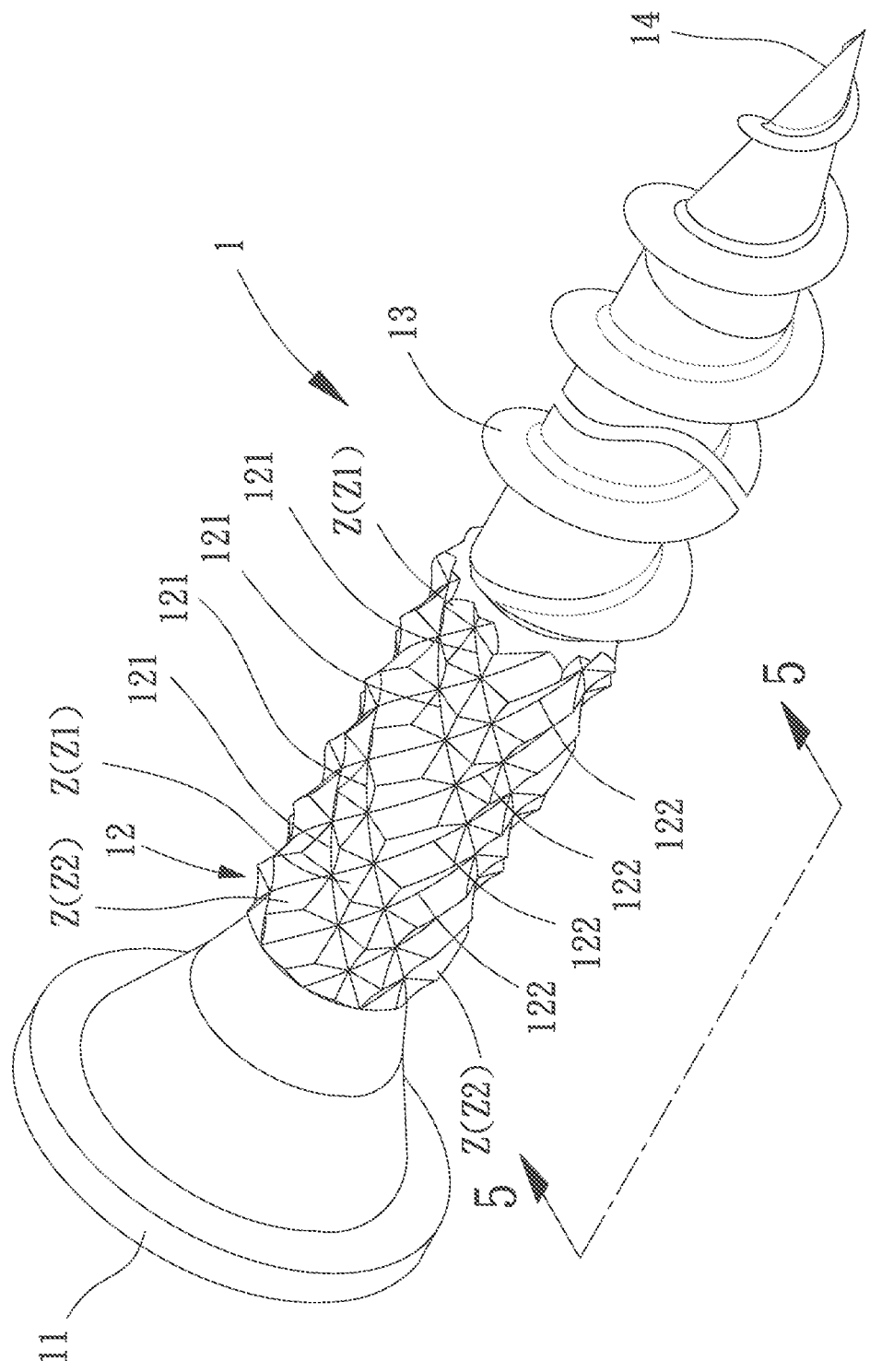
FIG. 4 shows a screw according to a first embodiment of the invention.
Figure 5:
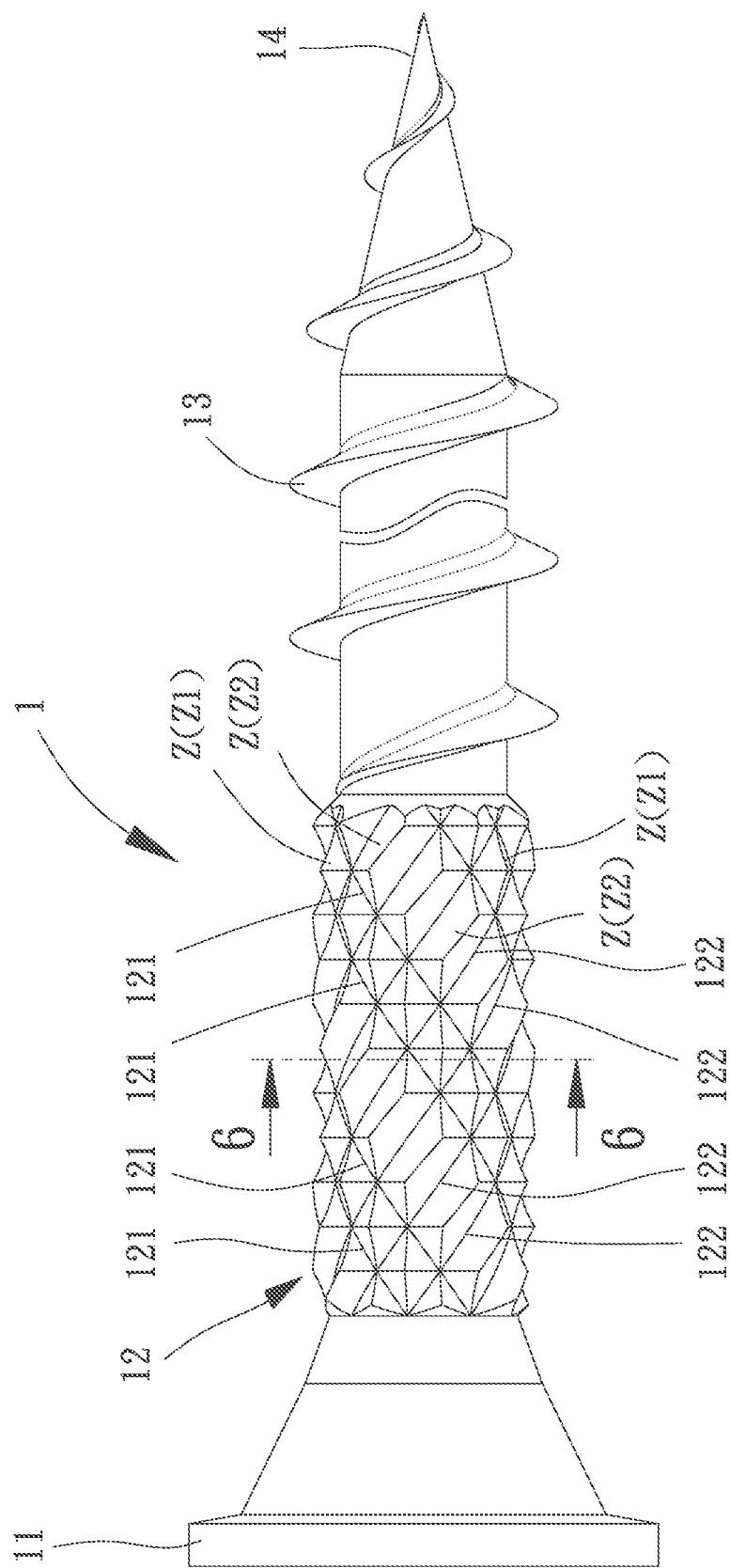
FIG. 5 is another view of the screw of FIG. 4.
Figure 6:
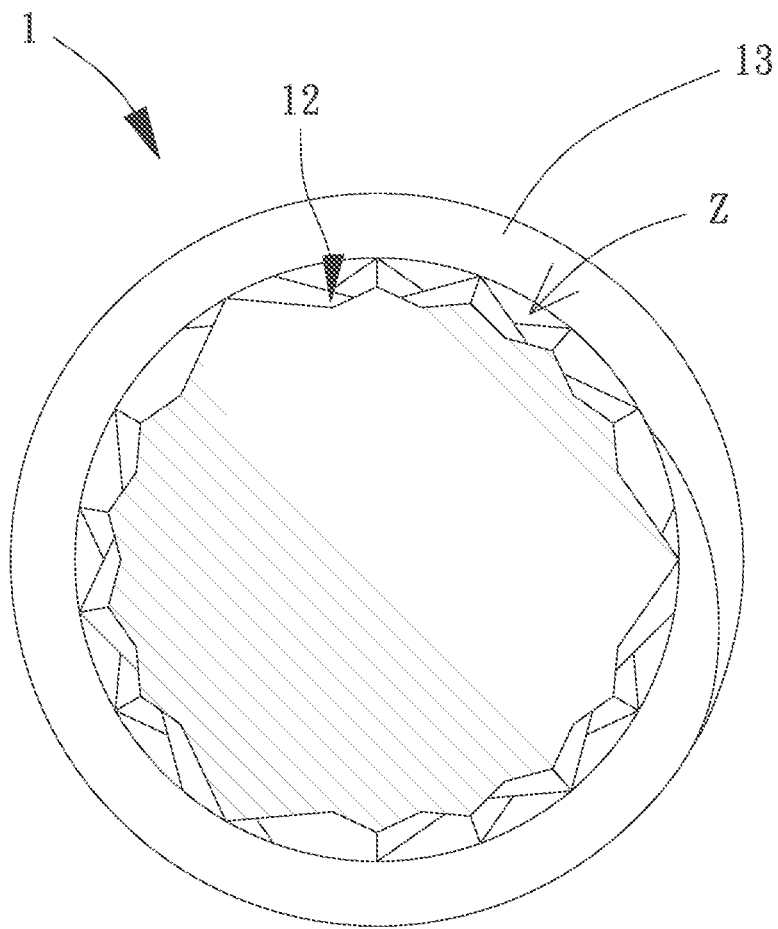
FIG. 6 is a cross sectional view of the screw taken along line 6-6 in FIG. 5.

FIG. 4 shows a screw according to a first embodiment of the invention. The screw includes a shank 1 with a head 11, a knurling section 12, a threaded section 13, and a point 14. The screw is driven into material at the point 14. The knurling section 12 is located between the head 11 and the threaded section 13 and includes a first set of grooves and a second set of grooves intersecting with the first set of grooves. The point 14 may be a threaded sharp point as shown here or what is often referred to as self-drilling point, generally used for driving into harder materials such as steel. Referring to FIGS. 4 and 5, the first set of grooves includes a plurality of first grooves 121 with unequal spacing which runs in a first angle relative to an axis of the shank 1. The second set of grooves includes a plurality of second grooves 122 with equal spacing which runs in a second angle relative to the axis of the shank 1. The first angle is larger than 0 degrees in this embodiment. The first grooves 121 intersect with the second grooves 122 to form a plurality of intersecting zones Z with irregular shapes and sizes. Specifically, the intersecting zones Z are categorized as intersecting zones Z1 each having a shape resembling a square, as well as intersecting zones Z2 each having a shape resembling a rectangle. The knurling section 12 forms a number of peaks in zones Z1 and a number of ridges in zones Z2. The peaks and the ridges are randomly distributed along the outer surface of the shank 1. Each peak is in the general shape of a pyramid. Each ridge is essentially elongated or is a rectangular pyramid. Thus, this structure forms a pattern of pyramids (in zones Z1) and ridges (in zones Z2) where all pyramids are equal to each other and all ridges are equal to each other. In this embodiment, the ridges are the same height of the peaks. This structure ends up with a series of pyramids and ridges. However, depending on the application and design of the grooves, the heights of each aforementioned item or can change relative to each other. FIG. 6 is a cross sectional view of the screw taken along line 6-6 in FIG. 5.

Figure 7:
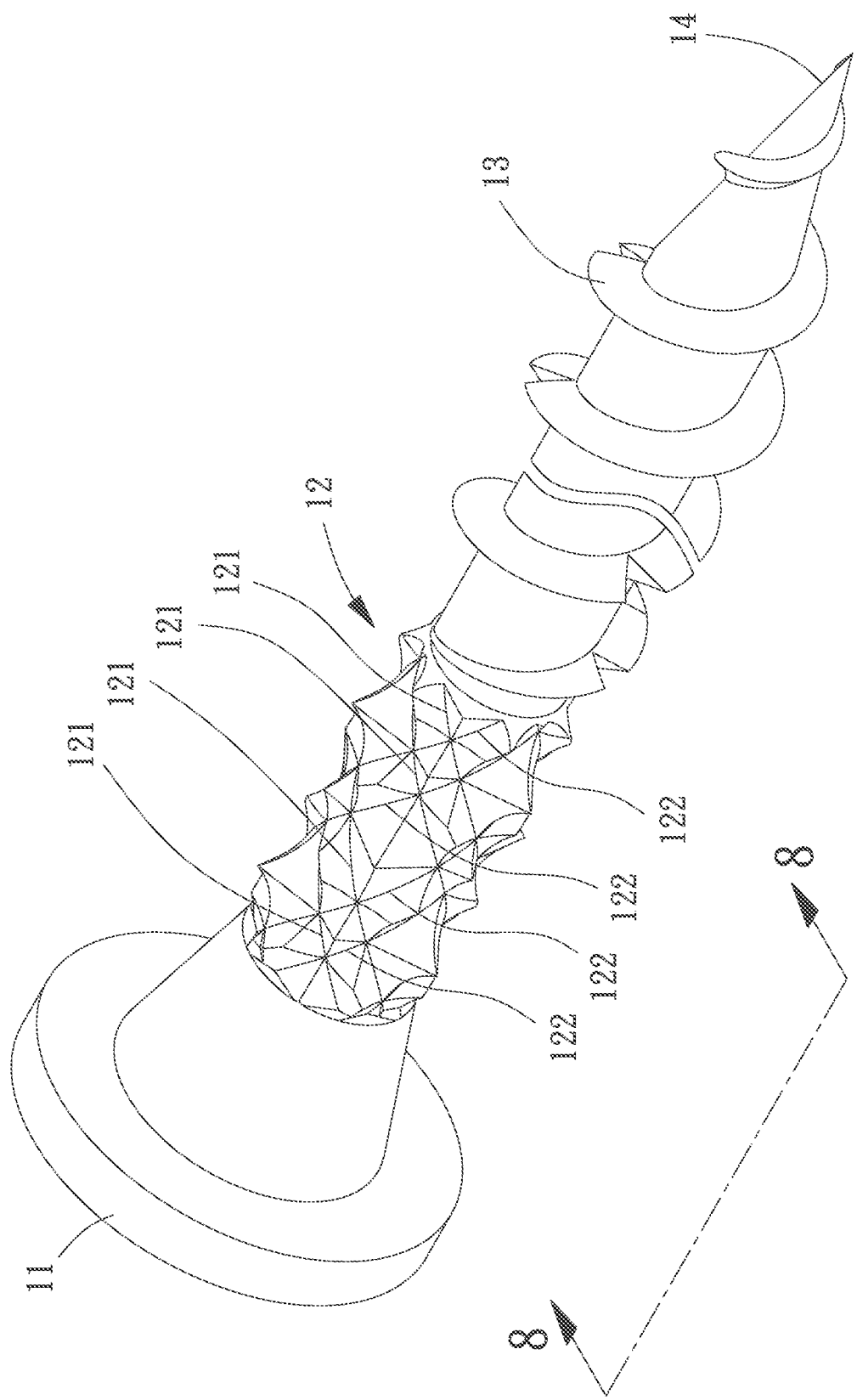
FIG. 7 shows a screw according to a second embodiment of the invention.
Figure 8:
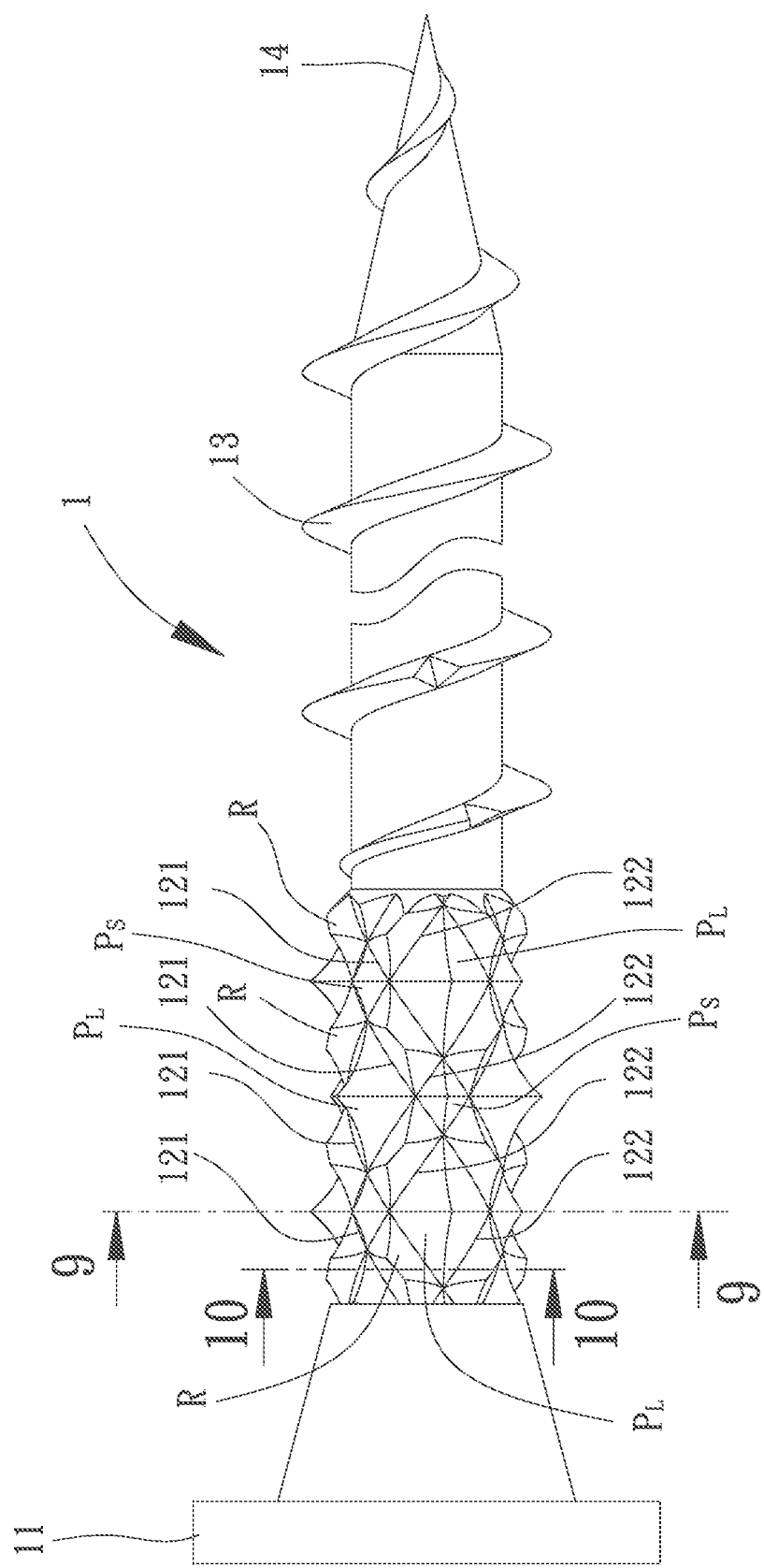
FIG. 8 is another view of the screw of FIG. 7.

FIG. 7 shows a screw according to a second embodiment of the invention. Referring to FIG. 8, the second embodiment differs from the first embodiment in that the knurling section 12 forms a number of small peaks $P_S$, a number of large peaks $P_L$, and a number of ridges R in the intersecting zones Z. The small peaks $P_S$, the large peaks $P_L$ and the ridges R are randomly distributed along the outer surface of the shank 1. Each of the small and large peaks $P_S$ and $P_L$ is in the general shape of a pyramid (either small or large). Each ridge R is essentially elongated or a rectangular pyramid. In this embodiment, the large peaks $P_L$ are higher than the small peaks $P_S$, and the ridges R are the same height of the small peak $P_S$. However, the height of each of the aforementioned items $P_S$, $P_L$ and R can change relative to each other depending on the application and design of the grooves. This type of knurling is generally formed by having the grooves of the first and second sets of grooves at different spacings, depths, heights, and/or shapes from each other.

In the second embodiment, within the first set of grooves, the plurality of first grooves 121 run parallel to each other. Also, within the second set of grooves, the plurality of second grooves 122 runs parallel to each other as well. The spacings, the depths, the heights and/or the shapes are different within each set of the grooves. This may or may not be done in a repeating manner. The first and second sets of grooves can run at any angle relative to each other. In this embodiment, the plurality of first grooves 121 of the first set of grooves runs in the same direction at the threaded section 13 and the plurality of second grooves 122 runs in a counter direction to the threaded section 13.

Figure 9:
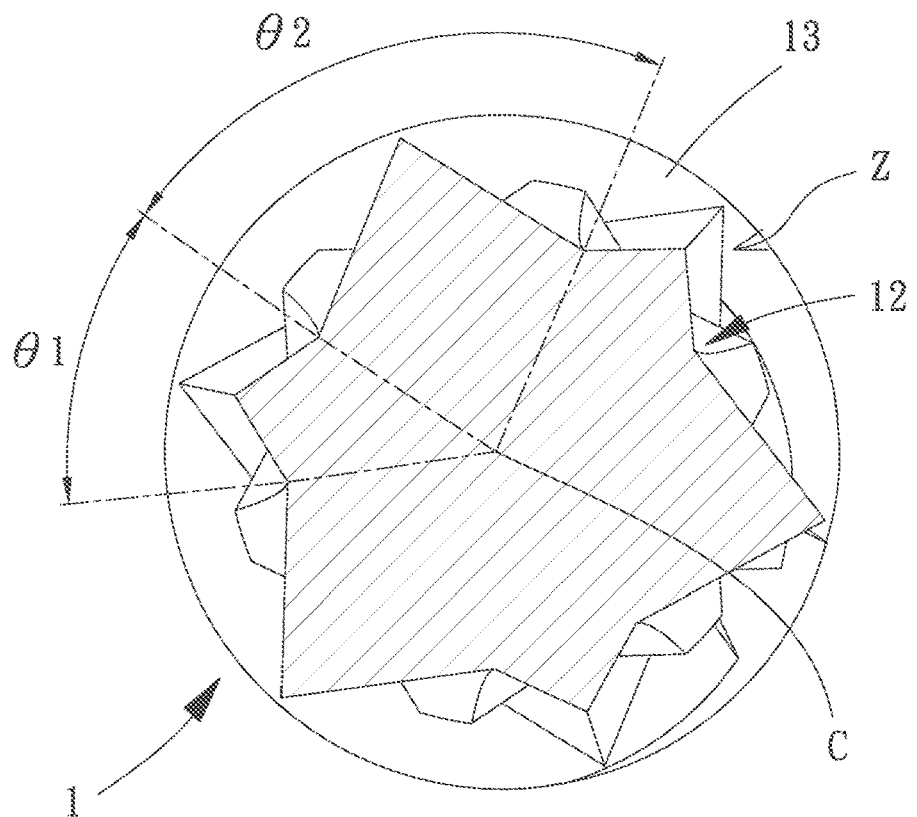
FIG. 9 is a cross sectional view of the screw at the intersection points of the grooves, as is taken along line 9-9 in FIG. 8.
Figure 10:
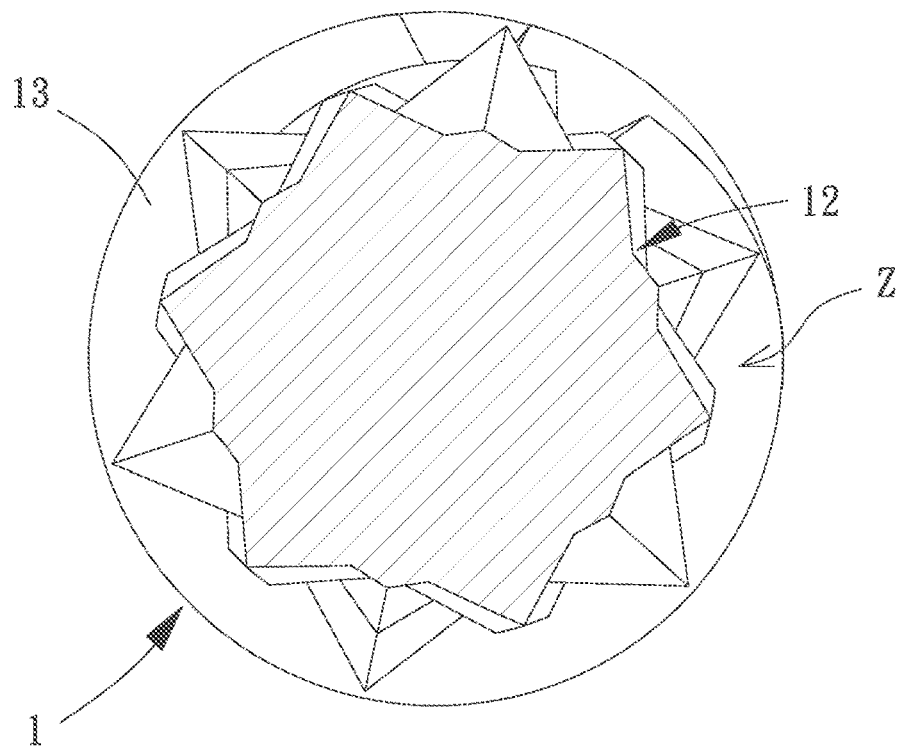
FIG. 10 is another cross sectional view of the screw made up of ridges between the intersecting points of the grooves, as is taken along line 10-10 in FIG. 8.

In the second embodiment shown in FIGS. 7 and 8, the first grooves 121 of the first set of grooves have unequal spacing. FIG. 9 shows the cross section through the tips of the high and low pyramids, the angles θ1 and θ2 from center C of the shank 1 between the grooves are 40° and 80°, respectively. They also have different heights of the formed peaks. This is just one way of forming the different shaped and sized knurling features. It is also possible of getting different shapes by changing the depth, height, spacing, shape of the grooves and their angles from the center C. It need not be a repeating pattern. FIG. 10 shows a cross sectional view of the screw taken along line 10-10 in FIG. 8.

Referring back to the first embodiment where the first grooves 121 have unequal spacing and the second grooves 122 have equal spacing as shown in FIG. 4, the spacing in the second set of grooves is approximately 40° from the center C of the shank 1 and the spacing in the first set of grooves follows a 40° and 80° alternating pattern from the center C of the shank 1. This is just one way of forming the different shaped and sized knurling features. It is also possible of getting different shapes by changing the depth of each groove, spacing and its angle from the center C. It need not be a repeating pattern.

In the first and second embodiments above, although the first and second sets of grooves are shown to run at an angle relative to the axis of the screw, one of the first and second sets of grooves may run parallel with the axis of the screw (the first or second angle being 0 degree) while the other set of grooves may run in a different angle of the axis of the screw, including perpendicular to the axis.

Figure 11:
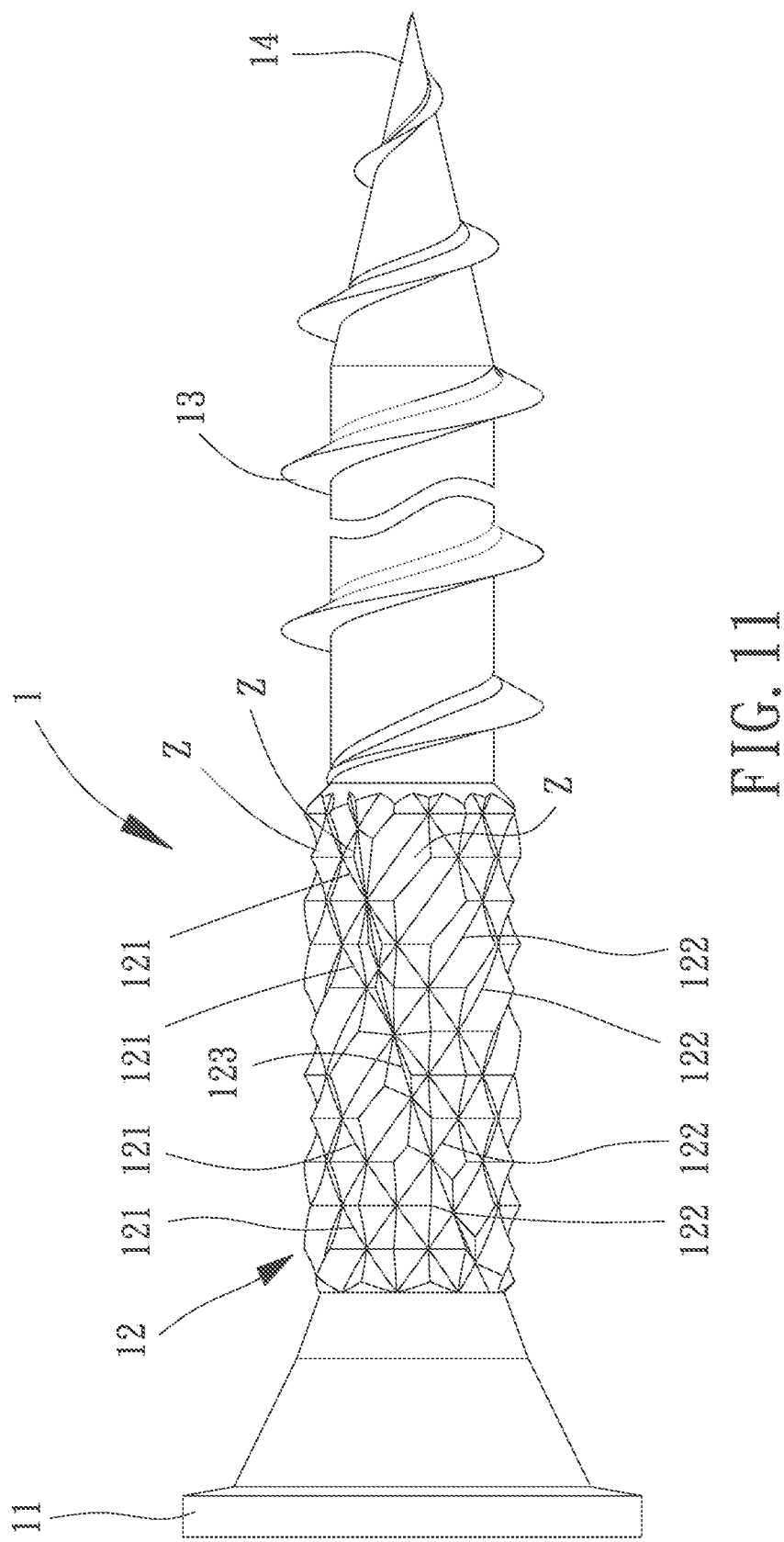
FIG. 11 shows a screw according to a third embodiment of the invention.

FIG. 11 shows a screw according to a third embodiment of the invention. In this embodiment, the first set of grooves includes a plurality of first grooves 121 with unequal spacing. The second set of grooves includes a plurality of second grooves 122 with equal spacing. As compared with the previous embodiments, the screw in this embodiment further includes a third set of grooves. The third set of grooves can include one or more third grooves 123 intersecting with the first and second sets of grooves. In FIG. 11, only one third groove 123 is shown for simplicity, but it actually can include plural third grooves 123. In this embodiment, the first, second and third sets of grooves intersect with each other to form a plurality of intersecting zones Z, which includes not only the square-like and rectangle-like zones as is shown in FIG. 4, but also some irregular zones around the intersecting areas of the third groove 123.

In the third embodiment, the first, second and third sets of grooves are shown to run at any angle relative to each other. However, one of the first, second and third sets of grooves can run parallel with the axis of the screw (the first or second angle being 0 degree) while the other two sets of grooves may respectively run in different angles of the axis of the screw.

Figure 12:
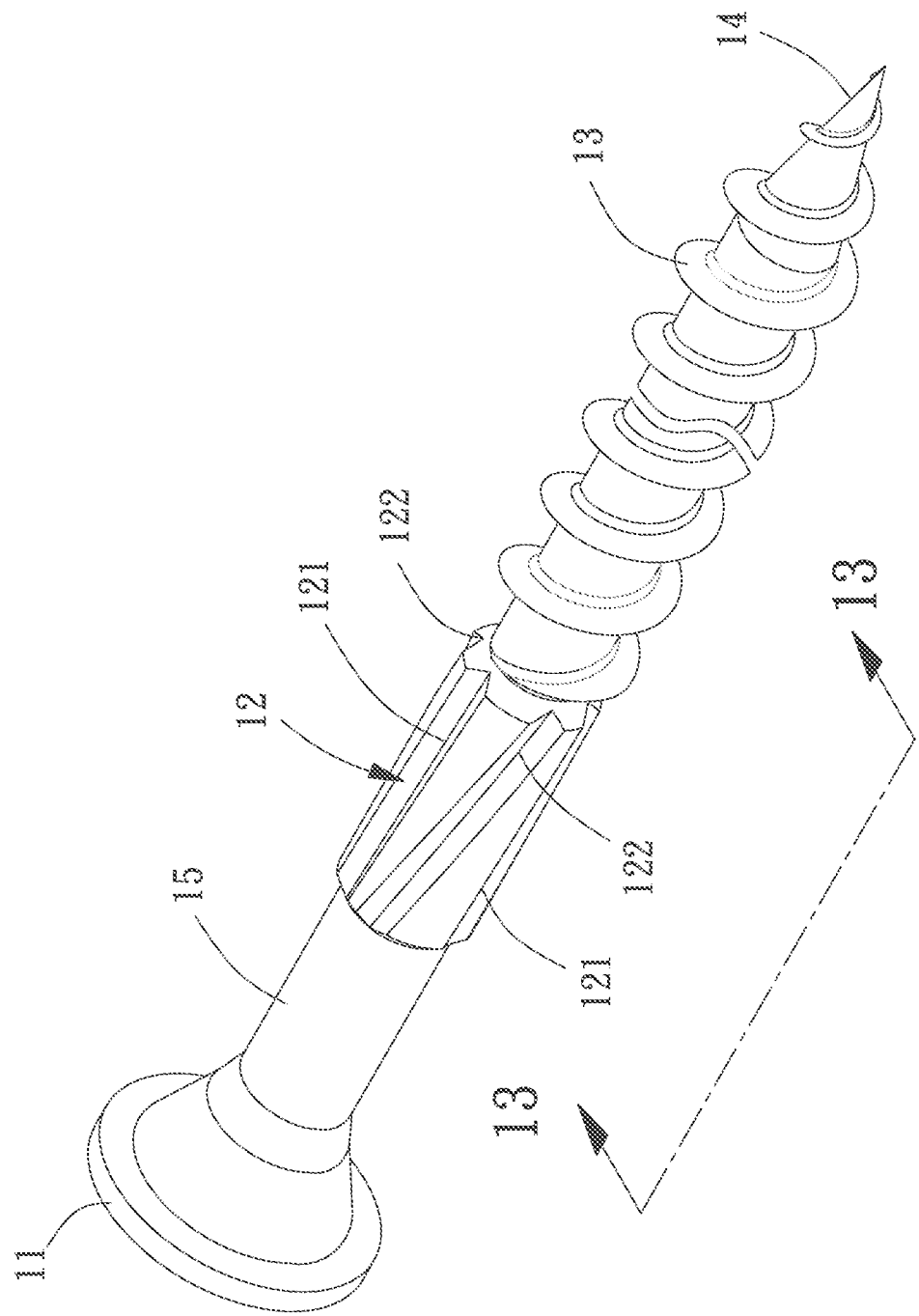
FIG. 12 shows a screw according to a fourth embodiment of the invention.
Figure 13:
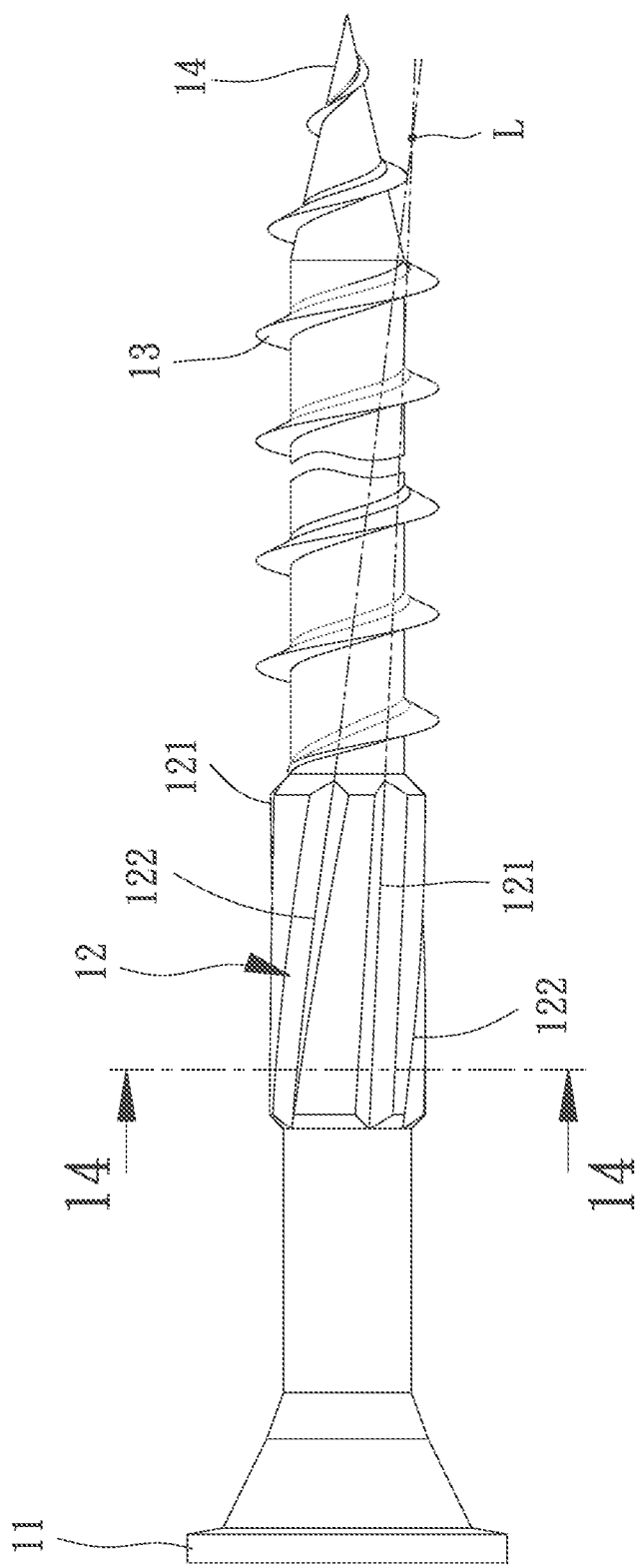
FIG. 13 is another view of the screw of FIG. 12.
Figure 14:
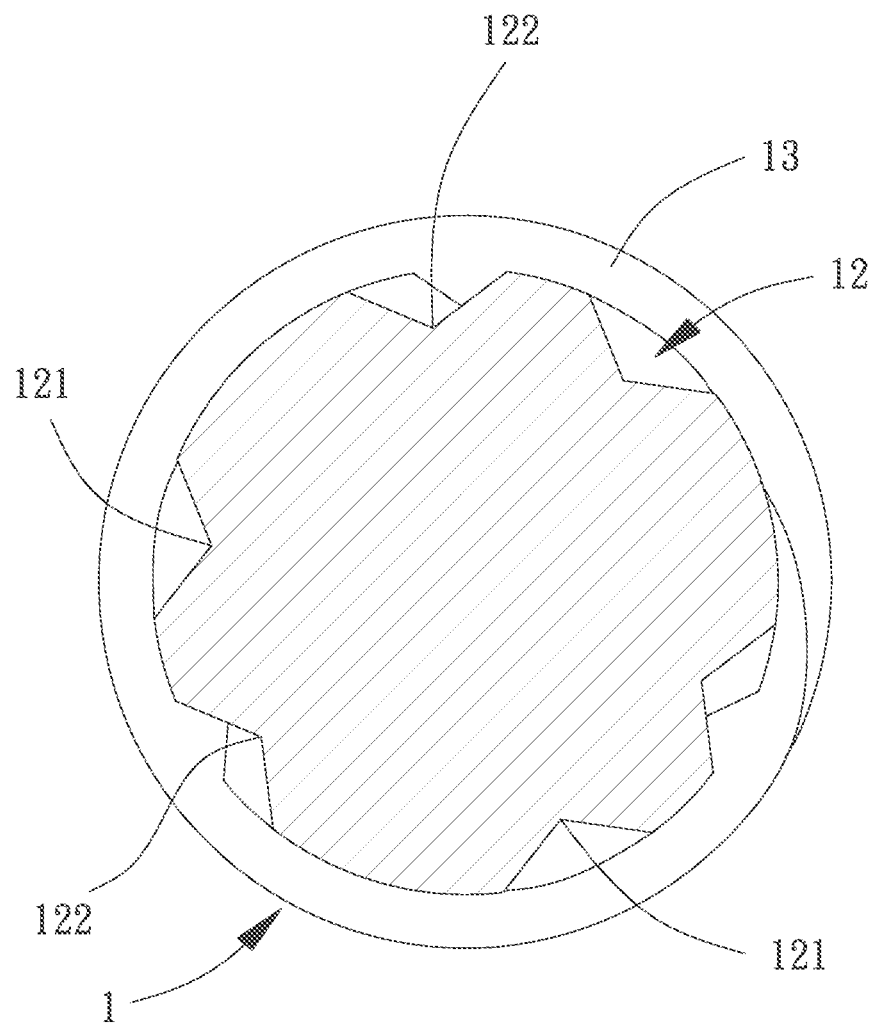
FIG. 14 is a cross sectional view of the screw taken along line 14-14 in FIG. 13.
Figure 15:
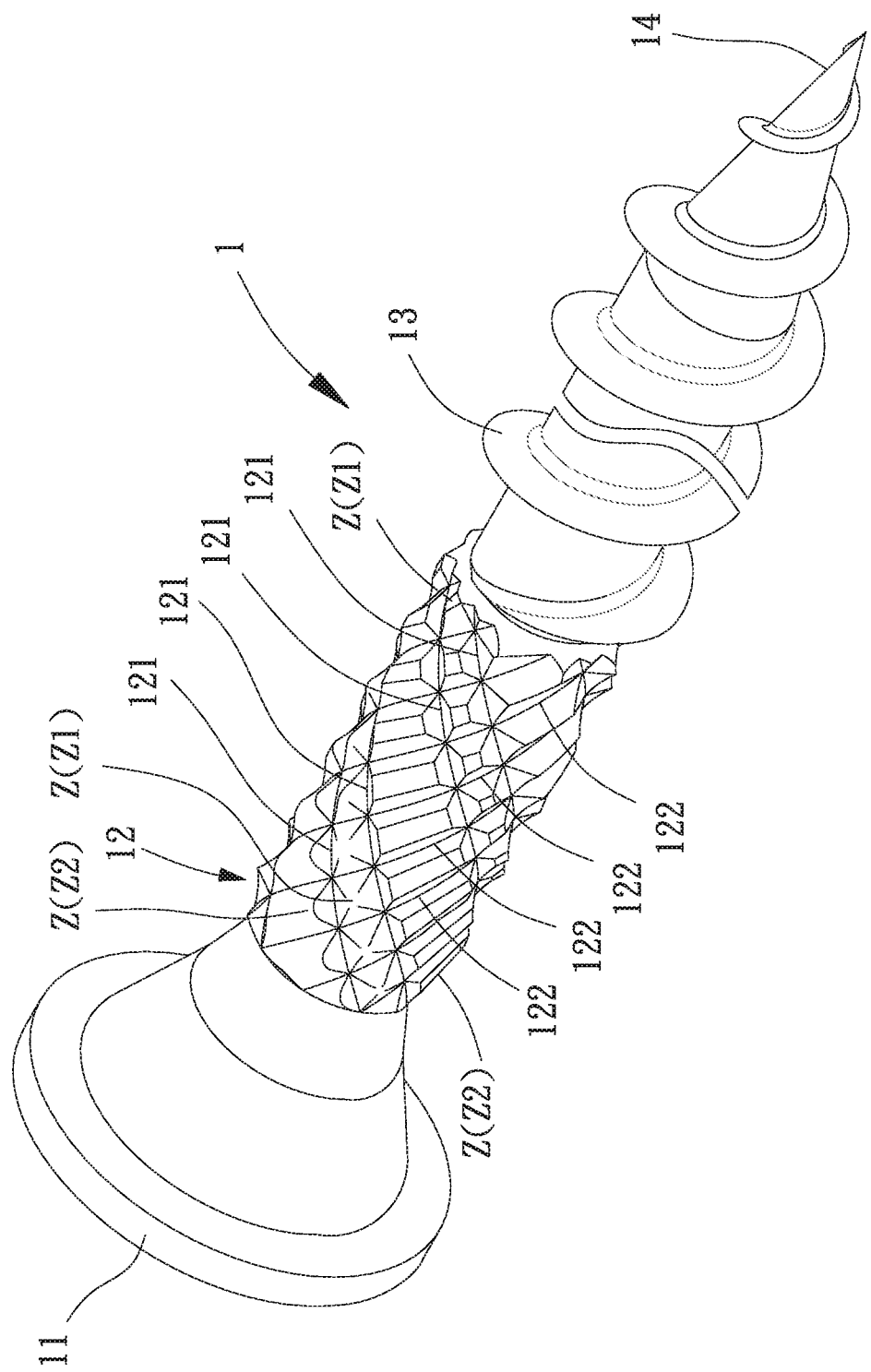
FIG. 15 is perspective view of a screw according to an embodiment of the present invention.

FIG. 12 shows a screw according to a fourth embodiment of the invention. As compared with the previous embodiments, the screw in this embodiment further includes a blank section 15 (without any feature) between the head 11 and the knurling section 12. The knurling section 12 includes a first set of grooves and a second set of grooves. The first and second sets of grooves also intersect with each other, but outside of the scope of the knurling section 12. Specifically, the first set of grooves includes a plurality of first grooves 121 and the second set of grooves includes a plurality of second grooves 122. Referring to FIG. 13, the grooves 121 and 122 intersect with each other at a position beyond the scope of the knurling section 12, such as an intersection L in FIG. 13. That is, the length of the knurling section 12 is not long enough for the grooves 121 and 122 to intersect. If the knurling section 12 was longer, they would. In this case, either the spacing between the grooves 121 and 122 is large enough and/or the difference in angle between the grooves 121 and 122 is small enough that the two sets of grooves do not visibly intersect but are not parallel to each other. Under the concept where the first and second sets of grooves do not intersect within the scope of the knurling section 12, the resulting formations might be triangular or trapezoidal in nature. If there are more than two sets of grooves, there are many possible resulting shapes. Continuing this notion, there may be times where some grooves intersect inside the knurling section 12 and some grooves intersect outside the knurling section 12. FIG. 14 shows a cross sectional view of the screw taken along line 14-14 in FIG. 13.

In the fourth embodiment above, the blank section 15 is blank and may have a smaller diameter than the diameter of the knurling section 12. Thus, the powder produced by the knurling section 12 grinding the particles of the board material can be smoothly discharged through the blank section 15. Moreover, the blank section 15 can also be arranged between the knurling section 12 and the threaded section 13. This blank section 15 can be applicable to all embodiments. Alternatively, two blank sections 15 may be provided in which one blank section 15 is arranged between the head 11 and the knurling section 12 and the other one is arranged between the knurling section 12 and the threaded section 13.

In addition, in the embodiment shown in FIGS. 12-14, the surface of the knurling section 12 between the first grooves 121 and the second grooves 122 can also be designed to have the same or different heights, or can include a third set of grooves (not shown) intersecting one or both of the first and second sets of grooves inside or outside of scope of the knurling section 12. It is also noted that the third set of grooves can extend along the axis of the shank 1 or can be perpendicular to the axis of the shank 1. Moreover, the portion of the knurling section 12 between the first grooves 121 and the second grooves 122 can also form peaks or ridges with rounded/flattened tops.

Although all of the embodiment above are shown to have a single threaded portion 13, two threaded portions 13 can be used. In this situation, the knurling section 12 may be disposed between the two threaded portions 13, in which one threaded portion 13 is disposed between the knurling section 12 and the point 14 and the other threaded portion 13 is disposed between the head 11 and the knurling section 12.

In addition, the formed shapes do not necessarily need to result in a sharp point at the top or bottom. They can also have flattened tops or rounded tops. Moreover, there can be varying shapes and patterns formed by changing the offset, depth, height, shape, and angle of the grooves used to form the knurling section 12. Furthermore, in the above embodiments, each screw can bore out the hole in a smooth manner. The knurling section 12 can be used in frangible material as well as in wood boards. When the screw is inserted, the turning motion will cause the knurling to grind the material into a fine powder. The shape of the knurling helps grind different sized material particles while channeling the powder away.

What is claimed is:

1. A screw comprising a shank having a head, a point opposite to a center of the head along a longitudinal axis of the shank, a threaded section located between the head and the point, and a knurling section located between the head and the threaded section, wherein the knurling section includes a first set of grooves consisting of a plurality of first grooves and a second set of grooves consisting of a plurality of second grooves, wherein the plurality of first grooves extends in a first angle relative to the longitudinal axis of the shank, wherein the plurality of second grooves extends in a second angle relative to the longitudinal axis of the shank not parallel to the first angle, wherein the first angle is equal to or larger than 0 degrees, wherein each two adjacent first grooves of the plurality of first grooves has unequal spacing, wherein the plurality of first grooves intersects with the plurality of second grooves to form a plurality of intersecting zones with peaks and ridges of different sizes and shapes, and wherein each of the peaks has an uppermost vertex and each of the ridges has an uppermost line.

2. The screw as claimed in claim 1, wherein each two adjacent second grooves of the plurality of second grooves has unequal spacing.

3. The screw as claimed in claim 1, wherein the peaks and the ridges have a same height relative to a surface of the shank.

4. The screw as claimed in claim 1, wherein the peaks and the ridges have different heights relative to a surface of the shank.

5. The screw as claimed in claim 1, wherein the first angle is larger than 0 degrees where one of the first and second sets of grooves runs in a same direction of the threaded section and another of the first and second sets of grooves runs in a counter direction of the threaded section.

6. The screw as claimed in claim 1, further comprising a third set of grooves consisting of one or more third grooves intersecting with the first and second sets of grooves.

7. The screw as claimed in claim 1, wherein the first angle is equal to 0 degrees where the first set of grooves runs along the longitudinal axis of the shank and the second set of grooves runs at the second angle relative to the longitudinal axis of the shank.

8. The screw as claimed in claim 1, further comprising another threaded section located between the knurling section and the head and running in a same direction or a counter direction of the threaded section.

9. The screw as claimed in claim 1, further comprising a blank section located between the knurling section and the head.

10. The screw as claimed in claim 1, further comprising a blank section located between the knurling section and the threaded section.

11. The screw as claimed in claim 9, further comprising another blank section located between the knurling section and the threaded section.

12. The screw as claimed in claim 1, wherein the uppermost vertex of each of the peaks is rounded, and wherein the uppermost line of each of the ridges is rounded.

13. The screw as claimed in claim 1, wherein the uppermost vertex of each of the peaks is flattened, and wherein the uppermost line of each of the ridges is flattened.

14. The screw as claimed in claim 1, wherein the point is a self-drilling point.

* * * * *